(12) United States Patent
Groh et al.

(10) Patent No.: US 9,399,941 B2
(45) Date of Patent: Jul. 26, 2016

(54) SYSTEM FOR EXHAUST GAS TREATMENT FOR INTERNAL COMBUSTION ENGINES

(71) Applicant: Hydac Electronic GmbH, Saarbrücken (DE)

(72) Inventors: Christian Groh, Gersheim (DE); Frank Kattler, Püttlingen (DE)

(73) Assignee: HYDAC ELECTRONIC GMBH, Saarbrücken (DE)

( * ) Notice: Subject to any disclaimer, the term of this patent is extended or adjusted under 35 U.S.C. 154(b) by 0 days.

(21) Appl. No.: 13/261,988

(22) PCT Filed: Apr. 5, 2013

(86) PCT No.: PCT/EP2013/001018
§ 371 (c)(1),
(2) Date: Nov. 13, 2014

(87) PCT Pub. No.: WO2013/178307
PCT Pub. Date: Dec. 5, 2013

(65) Prior Publication Data
US 2015/0159530 A1    Jun. 11, 2015

(30) Foreign Application Priority Data
Jun. 2, 2012  (DE) .......................... 10 2012 010 980

(51) Int. Cl.
| | |
|---|---|
| F01N 3/00 | (2006.01) |
| F01N 3/20 | (2006.01) |
| F04B 17/04 | (2006.01) |
| F04B 53/14 | (2006.01) |
| F04B 15/00 | (2006.01) |
| F04B 17/03 | (2006.01) |

(52) U.S. Cl.
CPC .............. *F01N 3/2066* (2013.01); *F04B 15/00* (2013.01); *F04B 17/03* (2013.01); *F04B 17/042* (2013.01); *F04B 53/14* (2013.01); *F01N 2610/02* (2013.01); *F01N 2610/148* (2013.01); *F01N 2610/1433* (2013.01); *F01N 2900/1808* (2013.01); *F01N 2900/1811* (2013.01); *Y02T 10/24* (2013.01)

(58) Field of Classification Search
USPC ................... 60/286, 295, 297, 298, 301, 303; 239/124, 125, 584, 585.1, 585.5
See application file for complete search history.

(56) References Cited

U.S. PATENT DOCUMENTS 6,526,746 B1 * 3/2003 Wu ........................ F01N 3/2066
                                                    239/585.1
7,467,749 B2 * 12/2008 Tarabulski ............ F01N 3/2066
                                                    239/132

(Continued)

FOREIGN PATENT DOCUMENTS

DE    198 19 579 C1    9/1999
DE    101 61 132 A1    6/2003

(Continued)

*Primary Examiner* — Binh Q Tran
(74) *Attorney, Agent, or Firm* — Wenderoth, Lind & Ponack, L.L.P.

(57) ABSTRACT

A system for exhaust gas treatment for internal combustion engines has a pump (1) for metered supply of a freezable substance, particularly a urea solution, to a supply device (23) introducing the substance into the exhaust gas flow. A compensation device (25) is provided as protection against damage to the system due to volume expansion when the substance freezes. The compensation device compensates for the volume expansion accompanying an increase of the fluid pressure when the substance freezes.

10 Claims, 5 Drawing Sheets

(56) References Cited

U.S. PATENT DOCUMENTS

| | | | |
|---|---|---|---|
| 7,770,823 B2 * | 8/2010 | Kubota | F02M 51/0675 239/533.12 |
| 8,201,393 B2 * | 6/2012 | Zapf | F01N 3/2066 60/286 |
| 8,225,602 B2 * | 7/2012 | Cavanagh | F01N 3/2066 60/295 |
| 8,973,895 B2 * | 3/2015 | Thomas | F01N 3/2066 137/625.48 |
| 8,978,364 B2 * | 3/2015 | Olivier | F01N 3/2066 239/124 |
| 2006/0013704 A1 | 1/2006 | Sawada et al. | |
| 2010/0212303 A1 | 8/2010 | Jaulmes et al. | |
| 2010/0313553 A1 | 12/2010 | Cavanagh et al. | |

FOREIGN PATENT DOCUMENTS

| | | |
|---|---|---|
| DE | 10 2004 011 123 A1 | 3/2005 |
| DE | 10 2008 036 265 A1 | 2/2010 |
| DE | 10 2010 036 109 A1 | 3/2012 |
| WO | WO 03/027454 A1 | 4/2003 |
| WO | WO 2007/071263 A1 | 6/2007 |

\* cited by examiner

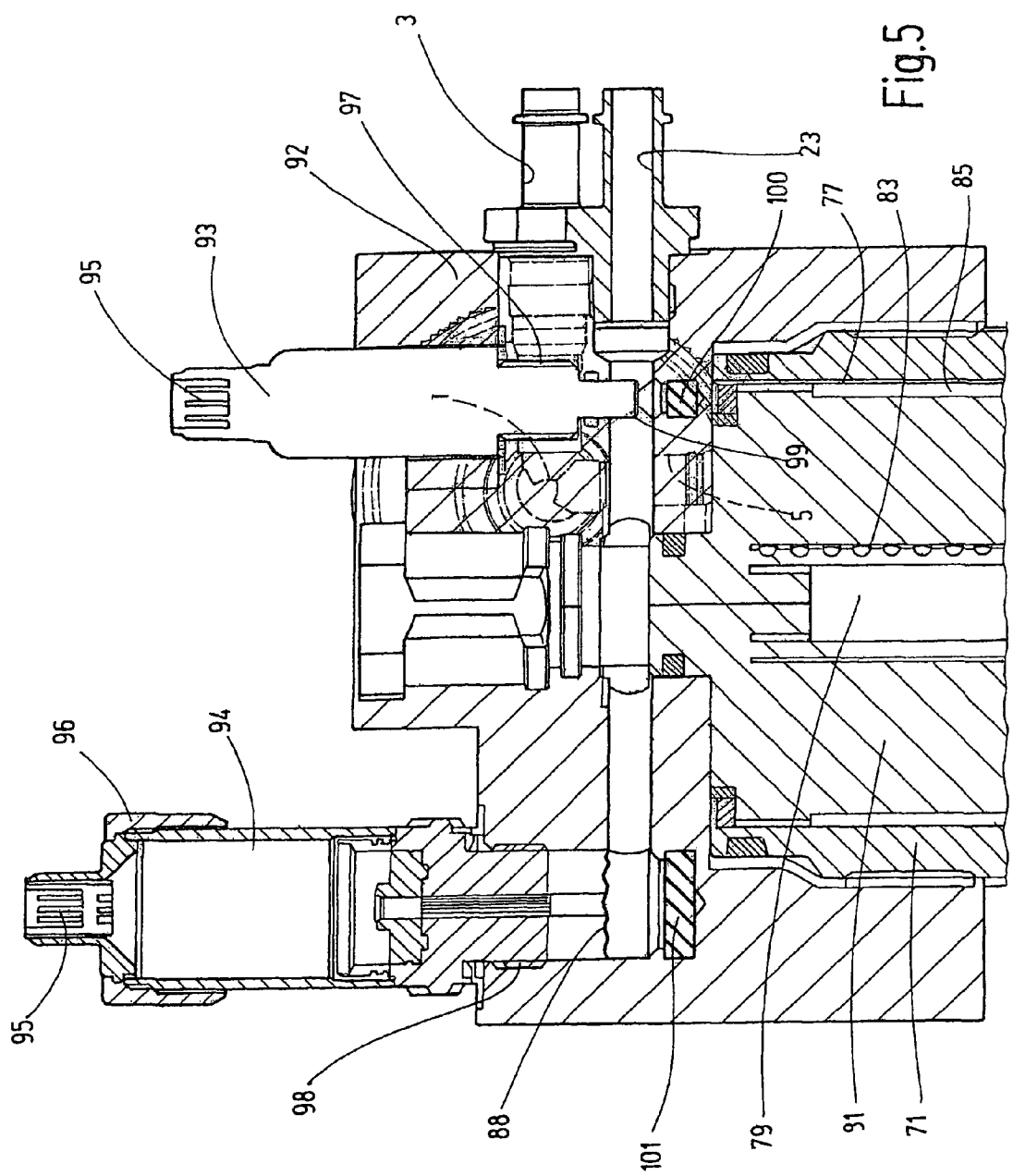

SYSTEM FOR EXHAUST GAS TREATMENT FOR INTERNAL COMBUSTION ENGINES

FIELD OF THE INVENTION

The invention relates to a system for exhaust gas treatment for internal combustion engines, comprising a pump for a metered supply of a freezable substance. In particular, an aqueous urea solution is conveyed to a supply device introducing the substance into the exhaust gas flow.

BACKGROUND OF THE INVENTION

Such systems, which are also referred to in technical language as the Adblue system, can be used in automotive engineering to reduce nitrogen oxides contained in the exhaust gas flow to nitrogen. This reduction takes place by the metered supply of an aqueous urea solution from a supply tank, via a supply device, to the exhaust gas flow. Ammonia is obtained from the urea by hydrolysis. The ammonia functions as a selective reducing agent in the exhaust gas flow. To optimize the efficiency of the reduction, the aqueous urea solution is supplied to the exhaust gas flow in a metered manner by a pump, which pump is controlled by a control device in a load-dependent manner.

The water content of the urea solution, which functions as an additional working substance, has a disadvantageous effect on the operating behavior. If the aqueous solution should freeze, the entire system could fail, in particular as a result of the pump and the supply device connected thereto becoming damaged or destroyed. This risk exists, in particular, during immobilization times at frost temperatures.

SUMMARY OF THE INVENTION

In light of these issues, the problem addressed by the invention is provide an improved Adblue system in which the risk of damage due to the effects of frost is minimized.

According to the invention, this problem is solved by a system having, as an essential special feature of the invention, a compensation device provided as protection against damage to the system due to volume expansion when the substance freezes. The compensation device compensates for the volume expansion accompanying an increase of the fluid pressure when the substance freezes. The risk that would exist otherwise is thereby avoided, namely that, if an aqueous substance freezes, as is the case with an aqueous urea solution under frost conditions, the resultant increase in volume causes walls to burst or, in particular, damages or destroys the pump and/or the valve devices that belong thereto.

In a particularly advantageous manner, the compensation device can comprise at least one component that is connected to the fluid chamber of the system and that has predetermined resilience that enables the fluid chamber to enlarge in a pressure-dependent manner.

To provide such resilience, in the case of exemplary embodiments comprising a displacement-type pump having at least one displacement element that can be moved by an actuator, the displacement element can interact with the actuator via a resilient coupling device that permits a pressure-dependent relative motion to take place.

In particularly advantageous exemplary embodiments, a piston pump comprising at least one pump piston can be provided. The coupling device has a compression spring installed between the respective pump piston and the actuator and allowing the piston to move, against the spring force of the compression spring and relative to the actuator. The fluid chamber is then enlarged.

Particularly advantageously, the actuator can be formed by an actuating part of a magnet piston, which can move axially in the pole tube of a solenoid device.

In particularly advantageous exemplary embodiments, the pump piston can be lengthened, on the side facing away from the fluid chamber, by a sleeve part that is guided in the pump cylinder and that is open toward the actuating part of the magnet piston. The compression spring is disposed in the interior space of the sleeve part. Due to the fact that the lengthened piston guide is used simultaneously as the spring housing, a compact design of the pump can be obtained.

In an advantageous manner, the solenoid device can be designed as a pressing magnet. When current flows through the magnet coil, the magnet presses the magnet piston, together with the actuating part, against the compression spring and moves the pump piston for a delivery stroke.

The arrangement is preferably designed such that, when current is not supplied to the magnet coil, a return spring acts on the pump piston and moves the pump piston for a return stroke.

To preload the actuating part of the magnet piston against the compression spring in a force-locking manner when current is not supplied to the magnet coil, a spring that acts counter to the return spring can act on the magnet piston. The spring force of this spring is less than that of the return spring.

In particularly advantageous exemplary embodiments, a magnet coil that heats up when supplied with current is provided as a heat source, to function as freeze protection and as a thawing device via a thermal coupling to the pump. In a particularly advantageous manner, when a cold start of the internal combustion engine is attempted under frost conditions, with the urea solution frozen and, therefore, the pump blocked, the cold-running phase, in which exhaust gas treatment does not take place, lasts only for as long as the time required for the pump to be automatically thawed out by the heat of the magnet coil. The pump can then begin operating, and exhaust gas treatment can begin. By the heat provided by the magnet coil, in the event that the ambient temperature drops into the frost range during operation, the pump is then prevented from freezing. The failure of the exhaust gas treatment that would result is also prevented.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure:

FIG. 5 is an enlarged, schematically simplified, partial side view in section of only of the region of a system according to a third exemplary embodiment of the invention that is adjacent to an end region of the filter device and that comprises sensors.

DETAILED DESCRIPTION OF THE INVENTION

Figure 1:
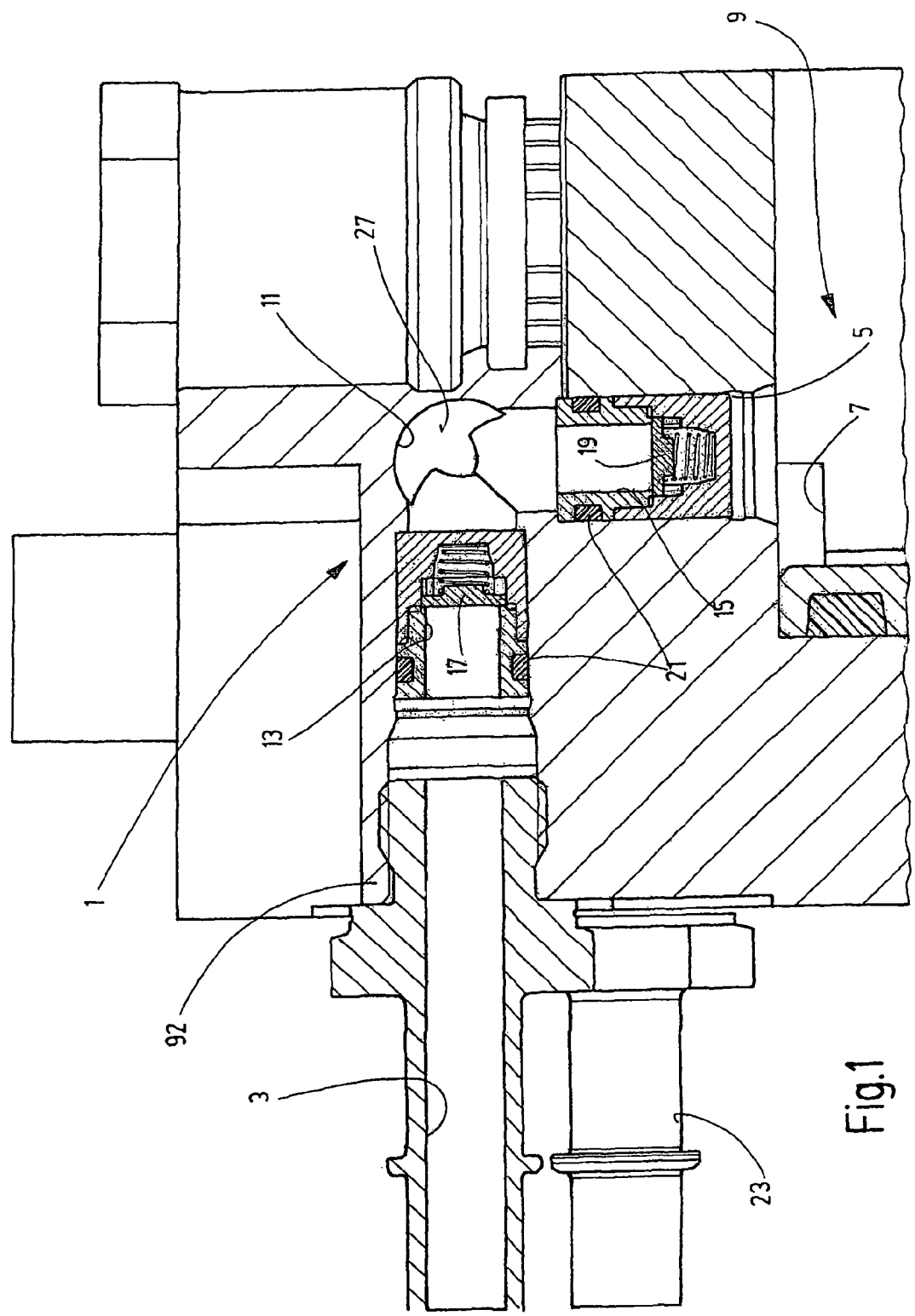
FIG. 1 is a side view in section only of the region of system according to a first exemplary embodiment of the invention that is adjacent to the pump, being enlarged and cut off with respect to a practical embodiment.
Figure 3:
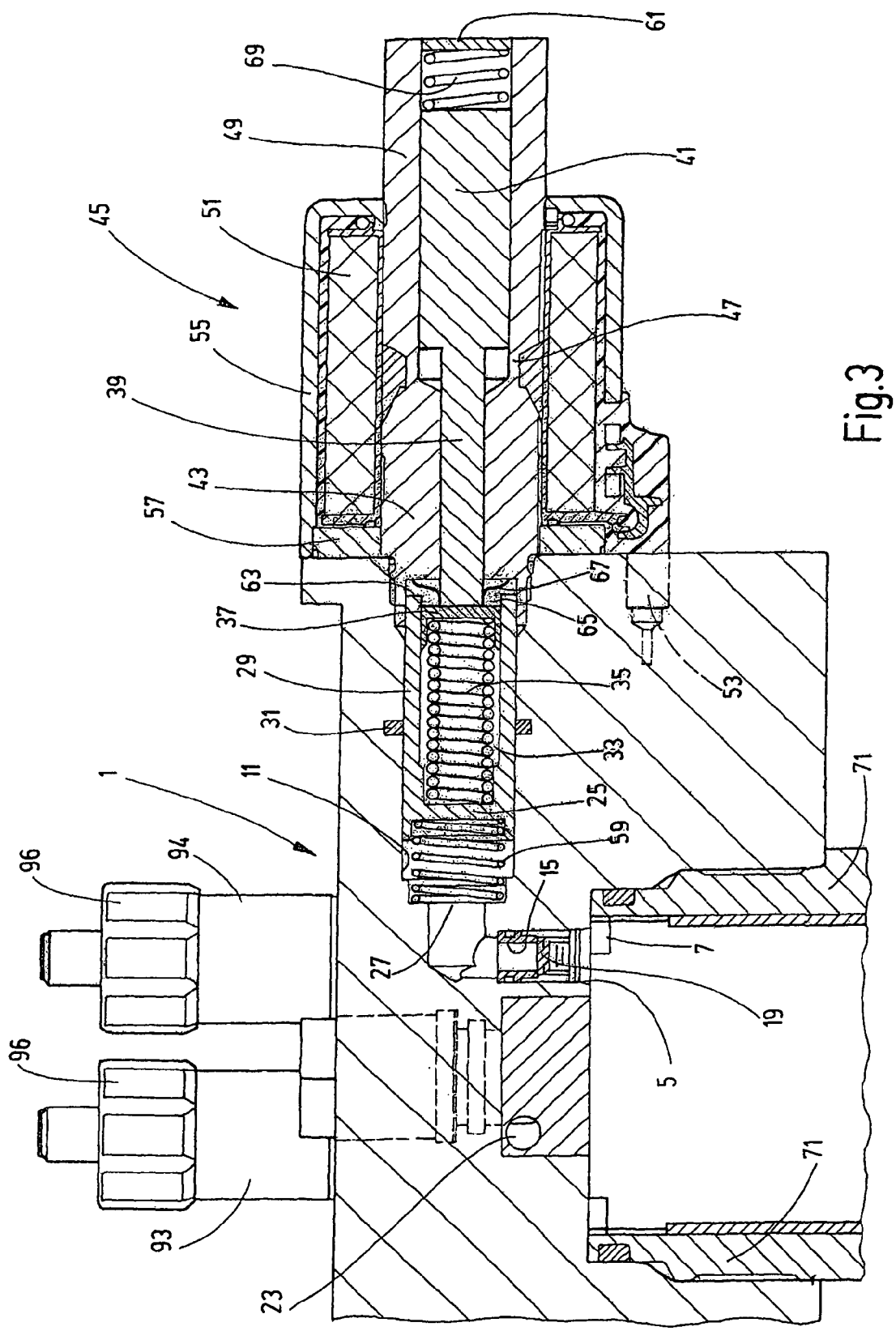
FIG. 3 is a side view in section of the region of a system according to a second exemplary embodiment of the invention, adjacent to the pump wherein a filter device is incompletely shown.
Figure 4:
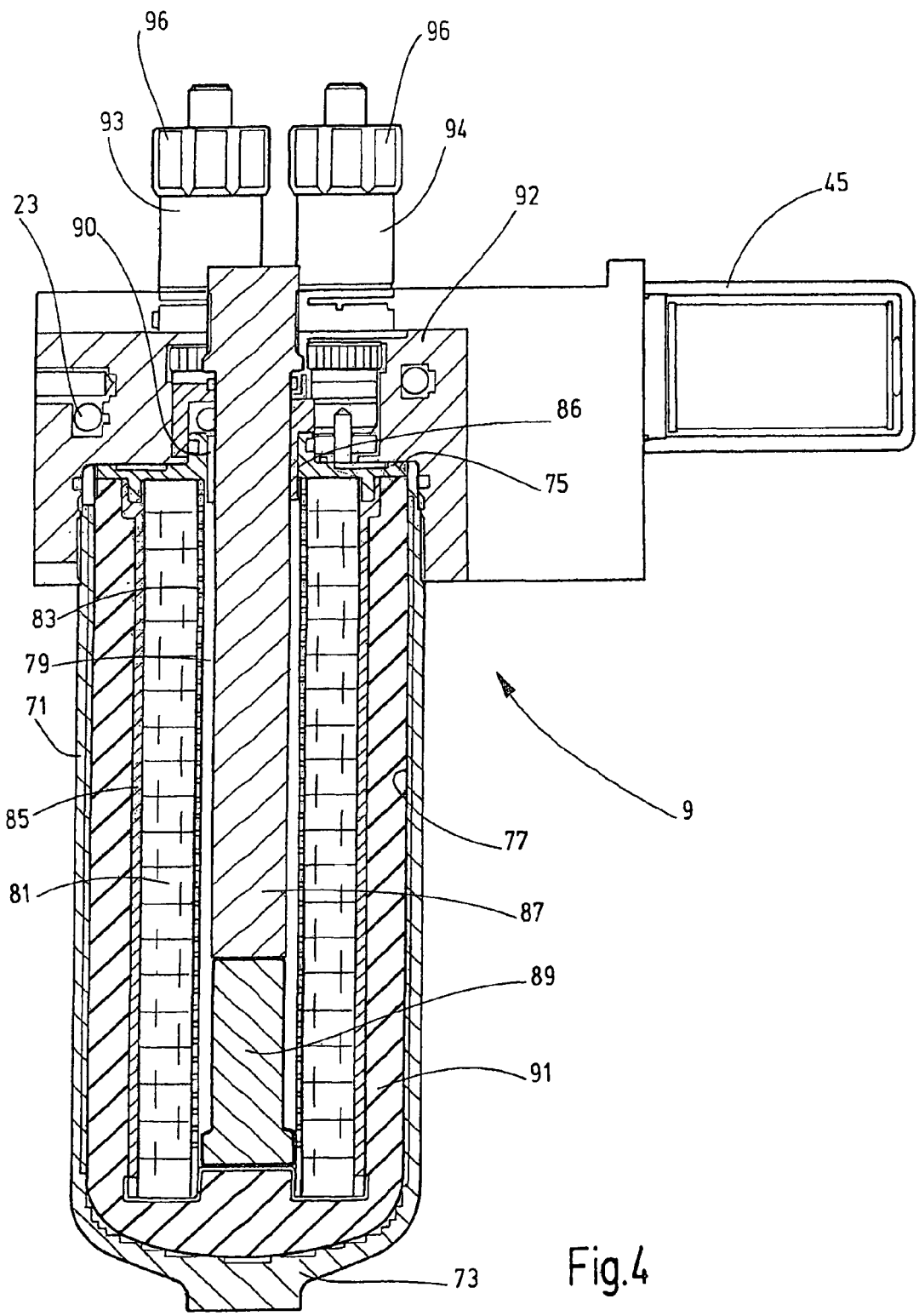
FIG. 4 is a schematically simplified, side view in section of only the filter device for the exemplary embodiments of the system according to the invention.

Proceeding from an exemplary embodiment of the system according to the invention, FIG. 1 shows a pump 1 as a component of a supply device. The supply device extends from a non-illustrated supply tank containing a supply of an aqueous urea solution, via the pump 1 to a filter device, which is best shown in FIG. 4, and, from the filter device to an injection nozzle (likewise not illustrated). The injection nozzle sprays a metered amount of the urea solution into the exhaust gas stream. In addition, a further or second pump or another type of delivery system that increases the pressure to the final injection pressure can be provided. The urea solution reaches the pump 1 via an inlet line 3. The pump delivers a metered amount of the urea solution from the pump outlet 5 to the filter inlet 7 of the filter device 9, which is depicted in greater detail in FIG. 4. As is clear from FIGS. 2 and 3, the pump 1 is designed as a piston pump, the cylinder 11 of which is visible in FIGS. 2 and 3 and, in each case, is rotated 90° relative to the plane of the drawing of FIG. 1. As shown in FIG. 1, non-return valves 13 and 15, respectively, having spring-loaded closing bodies 17 and 19, respectively, are located at the inlet line 3 and at the outlet 5 of the pump 1. The non-return valve 13 opens during the intake stroke of the pump 1, and the non-return valve 15 opens during the delivery stroke of the pump 1. Sealing rings 21 form the seal at the non-return valves 13, 15. The urea solution emerging from the filter device 9 reaches the exhaust gas stream via an outlet line 23.

As mentioned previously, the pump 1 is a piston pump. The pump piston 25 is guided in the cylinder 11, and is lengthened at the end thereof facing away from the fluid chamber 27 of the pump 1 by a sleeve part 29. By sleeve part 29, the piston 25 is guided in an axially movable manner at the wall of the cylinder 11, with a piston seal 31 being provided for sealing. The inner space 33 of the sleeve part 29 is open at the end opposite the fluid chamber 27. A compression spring 35 is inserted into the inner space 33 from the open end. This compression spring 35 is supported on one side at the closed base of the sleeve part 29 and on the other side at a thrust element 37. Thrust element 37 is displaceable in the sleeve part 29 at the open end of the sleeve part. As an alternative, the thrust element could also be disposed on the inside, although the thrust element would then have to be sealed off from this inner space, for example, by an O ring.

Figure 2:
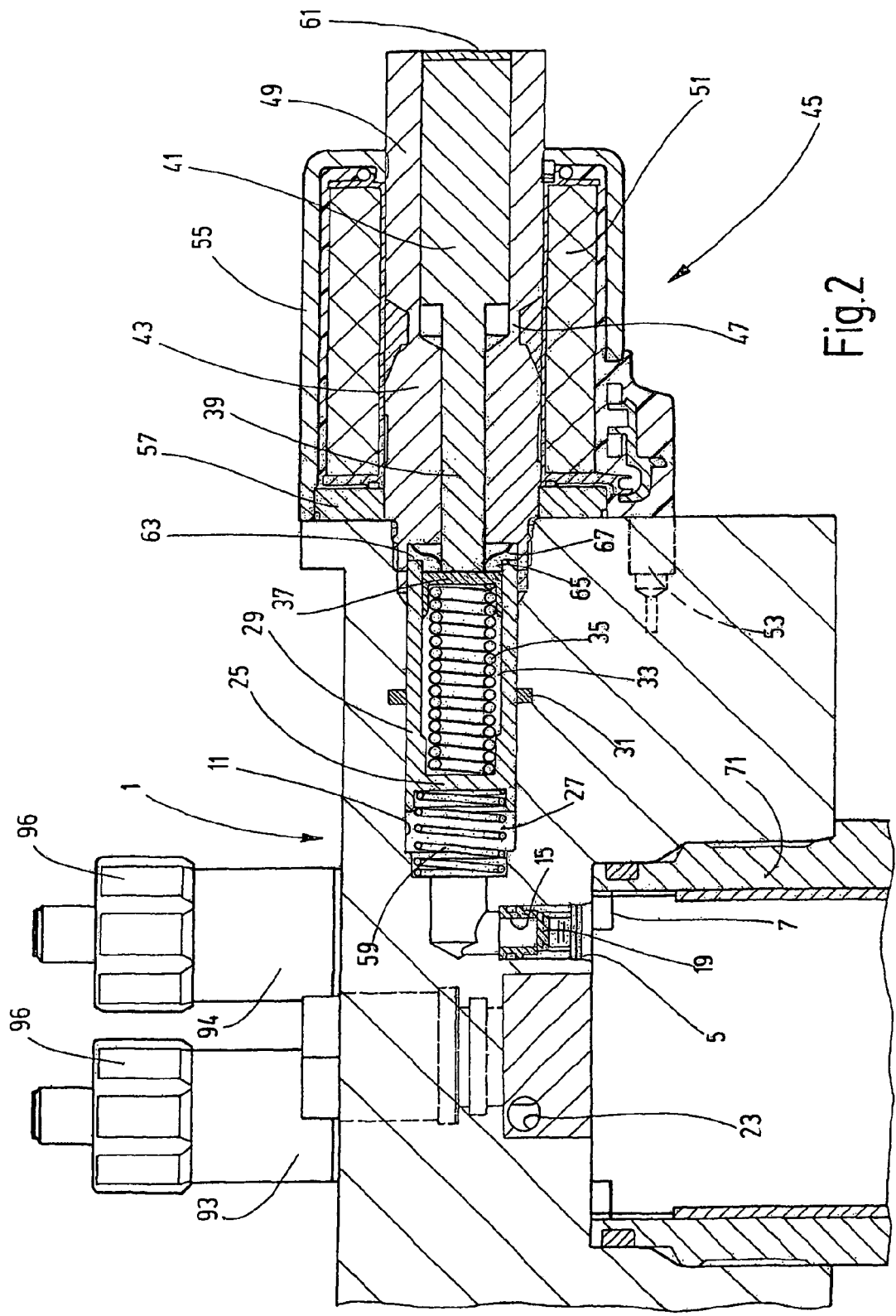
FIG. 2 is a side view in section of the region of the system of FIG. 1 adjacent to the pump, shown on a smaller scale than in FIG. 1 and being rotated by 90° relative thereto, wherein a filter device allocated thereto is incompletely shown.

An actuating part 39 interacts with the free side of the thrust element 37, with the actuating part being formed by an extension of a magnet piston 41. This actuating part 39 is displaceably guided in a pole body 43 of a solenoid device 45. The pole body 43 transitions into a pole tube 49 via a tapering point 47 having a reduced material cross section, which forms a magnetic gap. The magnet piston 41 connected to the actuating part 39, can move in the pole body 43. The magnet coil 51, which can be supplied with current via a connecting device 53, is located in a ferromagnetic magnet housing 55 having a pole plate 57. The solenoid device 45 is designed as a "pressing" magnet, wherein, when current is supplied to the magnet coil 51, the magnet piston 41 presses the actuating part 39 against the thrust element 37 and therefore presses the compression spring 35. As a result, the pump piston 25 is moved via the compression spring 35 to the left, as shown in the drawing, for a delivery stroke, by which a dosed amount of the urea solution is dispensed from the fluid chamber 27 via the non-return valve 15 at the pump outlet 5. FIGS. 2 and 3 each show the currentless state of the solenoid device 45. When current is supplied to the coil 51, the actuating part 39 moves the piston 25, for a delivery stroke, to the left as shown in the drawing against the force of a return spring 59. Return spring 59 is located in the fluid chamber 27. When the current supply to the coil 51 is halted, the actuating part moves the pump piston 25 back toward the right, into the starting position shown in FIGS. 2 and 3. In the exemplary embodiment of FIG. 2, the free end of the magnet piston 41 rests against an end stop, which is formed by a terminating element 61 at the end of the pole tube 49.

The pump piston 25 can perform a reciprocating motion even when the magnet piston 41 is located in an end position, as shown in FIG. 2. Further motion of the actuating part 39 is blocked in a direction that corresponds to the enlargement of the volume of the fluid chamber 27, because the compression spring 35 is a resilient component that can be compressed when the pressure increase in the fluid chamber 27 is excessive, thereby enabling the pump piston 25 to make a motion to the right as shown in the drawing, which enlarges the volume of the fluid chamber 27. The end 63 of the sleeve part 29 moves into a free space 65 at the pole body 43. Due to the thusly formed resilience, the increase in volume that occurs when the urea solution freezes in the fluid chamber 27 can be safely compensated. A diaphragm seal 67, as an additional sealing element, is located in the free space 65.

FIG. 3 shows a variant in which an additional spring 69 is provided instead of the fixed end stop of the magnet piston 41 formed by the end piece 61 in FIG. 2. The additional spring constantly holds the actuating part 39 of the magnet piston 41 against the thrust element 37 of the compression spring 35 in a force-locking manner, but has a weaker spring effect than the return spring 59.

FIG. 4 shows additional details of the filter device 9, which comprises a filter housing 71 in the form of a circular cylindrical pot having a closed base 73. The housing 71 is closed at the open end by an end cap 75 of a filter element 77, which is accommodated in the housing 71. The filter element 77 comprises a hollow cylindrical filter medium 81, which surrounds an inner filter cavity 79. The inner side of said filter medium rests against a support tube 83 and is enclosed on the outer side by a support body 85. Within the filter housing 71, the support body 85 delimits a partial volume that delimits the fluid chamber as a partial volume of the housing 71 that is in fluidic connection with the inner filter cavity 79. The inlet (filter inlet 7 of FIGS. 2 and 3) and the outlet 90 of the fluid chamber of the filter housing 71 are located at the end cap 75 of the filter element 77. An electric heating rod 87 extends through a central opening 86 of the end cap 75 and into the inner filter cavity 79. For the purpose of thermal coupling with the heating rod 87, a metallic filler piece 89 adjoins the heating rod 87 at the end thereof.

To allow the partial volume to enlarge relative to the remaining volume in the filter housing 71 when the aqueous urea solution freezes in the partial volume forming the fluid chamber, a casing 91 made of a material having a predefined compressibility is provided as a resilient element between the inner wall of the housing 71 and the outer side of the filter element 77. In the present exemplary embodiment, a casing 91 made of microcellular rubber is provided for this purpose and, in the example shown, completely surrounds the filter element 77, proceeding from the end cap 75. The casing 91 therefore fills all the residual volume within the filter housing 71. The residual volume decreases relative to the partial volume that forms the fluid chamber when the casing 91 is compressed to allow the partial volume formed by the fluid chamber to safely increase when the urea solution freezes in the fluid chamber.

FIG. 5 shows, in an exemplary embodiment of the system according to the invention, the connecting piece 92 comprising the inlet line 3, which leads to the pump 1, and the outlet line 23 for the metered delivery of the urea solution. A temperature sensor 93 and a pressure sensor 94 are connected to the outlet line 23. Each of the FIGS. 2 to 4 show plug caps 96 on the electric plug connection 95 of the sensors 93, 94, while FIG. 5 shows a plug cap 96 on only the pressure sensor 94. Both sensors 93, 94 are embodied as screw-in sensors and are screwed into the connecting piece 92 by screw-in threads 97 and 98. The measurement probe 99 of the temperature sensor 93 thereby extends into the outlet line 23. A pressure-transferring element, for example, in the form of a diaphragm 88, is fluidically connected to the outlet line 23 on the side having the pressure sensor 94.

A resilient component is assigned to each sensor 93 and 94 as freeze protection. The resilient component forms a resilient wall part at the fluid region of the respective sensor 93, 94. To this end, in the case of the temperature sensor 93, a resilient cushion 100, which is in the form of a cube made of microcellular rubber in the present example, is provided at the part of the outlet line 23 opposite the measurement probe 99. On the side having the pressure sensor 94, a cushion 101 in the form of a plate is disposed at a corresponding point of the outlet line 23. The plate is also made of microcellular rubber and forms a resilient wall part of the outlet line 23 at the inlet region of the sensor 94. Due to this resilience, the increase in volume that results when the aqueous urea solution freezes in the outlet line 23 can be compensated, thereby preventing damage to the connecting regions of the sensors 93, 94, such as the measurement probe 99 and the screw-in threads 97, 98.

Instead of a compressible body, such as the microcellular-rubber cushion, a resilient wall part could be provided at the outlet line 23 or at the sensor 93, 94, such as a component that is supported by a spring element, as shown in FIGS. 2 and 3.

While various embodiments have been chosen to illustrate the invention, it will be understood by those skilled in the art that various changes and modifications can be made therein without departing from the scope of the invention as defined in the claims.

The invention claimed is:

1. A system for exhaust gas treatment of an internal combustion engine, comprising:
   a pump actuator having an actuating part of a magnetic piston movably mounted in a pole tube of a solenoid;
   a displacement piston pump providing a metered supply of a freezable substance, said pump having a pump piston interacting with a fluid chamber temporarily accommodating the freezable substance, said pump piston being movable by said actuating part of said pump actuator;
   a supply device in fluid communication with said piston pump introducing the substance in an exhaust gas flow; and
   a compensation device acting on said fluid chamber providing a volume expansion accompanying an increase of fluid pressure in said fluid chamber when the substance freezes as protection against damage to the system, said compensation device including a resilient component connected to said fluid chamber and having a predetermined resilience enabling said fluid chamber to enlarge in a pressure dependent manner, said pump actuator being a component of said compensation device and interacts with the compensation device via a resilient coupling permitting a pressure dependent relative motion between said pump piston and said pump actuator, said resilient coupling including a compression spring tensioned between said pump piston and said actuating part allowing said pump piston to move against a spring force of said compression spring and relative to said actuating part to enlarge said fluid chamber.

2. A system according to claim 1 wherein
said pump piston is lengthened on a side thereof remote from said fluid chamber by a sleeve part, said sleeve part being guided in a pump cylinder and being open toward said actuating part of said magnet piston, said compression spacing being disposed in an interior space of said sleeve part.

3. A system according to claim 1 wherein
said solenoid comprising a pressing magnet pressing said magnet piston with said actuating part against said compression spring and moving said pump piston for a delivery stroke when current flows through a magnet coil of said solenoid.

4. A system according to claim 3 wherein
a return spring biases and moves said pump piston for a return stroke when no current flows through said magnet coil.

5. A system according to claim 4 wherein
a spring on said magnet piston preloads said actuating part against said compression spring force-lockingly and acts counter to a force of said return spring when no current flows through said magnet coil.

6. A system according to claim 1 wherein
a magnet coil of said solenoid forms a heat source when supplied with current and is connected to said piston pump via a thermal coupling providing freeze protection and a thawing device.

7. A system according to claim 1 wherein
said supply device comprises a filter filtering the freezable substance.

8. A system according to claim 1 wherein
said compensation device comprises a resilient element in a filter housing receiving said filter, said resilient element permitting pressure-dependent enlargement of a volume of a fluid interacting with aid filter housing.

9. A system according to claim 1 wherein
said supply device comprises a sensor device having sensors detecting pressure and temperature of the freezable substance.

10. A system according to claim 9 wherein
said sensor device interacts with said fluid chamber for temporary accommodation of the freezable substance; and
said compensation device comprises a resilient element permitting a pressure-dependent enlargement of said fluid chamber.

* * * * *